Aug. 2, 1949.　　　　B. W. KING　　　　2,477,881
CASTERING MEANS FOR AIRCRAFT LANDING MEANS
Filed March 23, 1945　　　　　　　　　　4 Sheets-Sheet 1
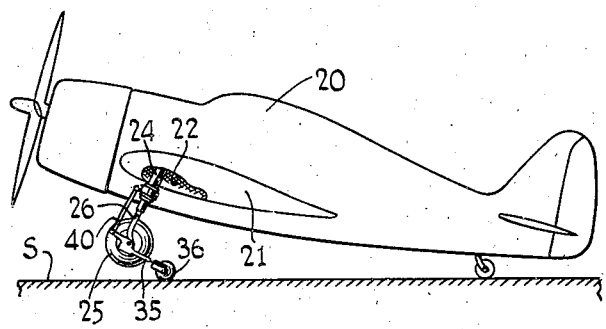
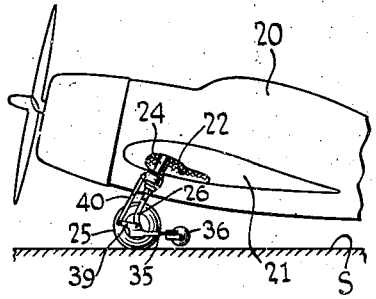
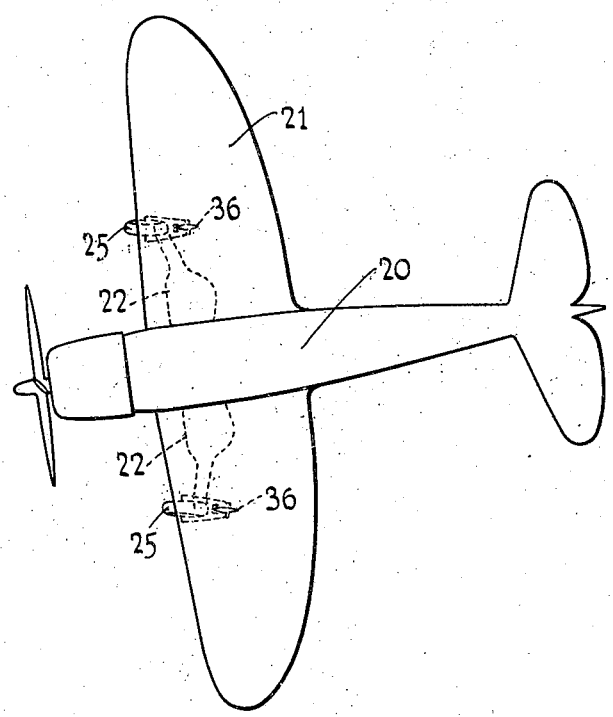
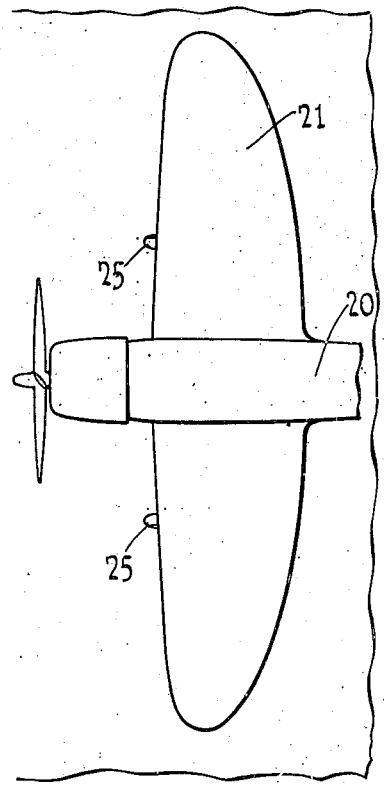
INVENTOR.
BERTELL W. KING
BY
Bohleber, Fassett & Montstream
ATTORNEYS

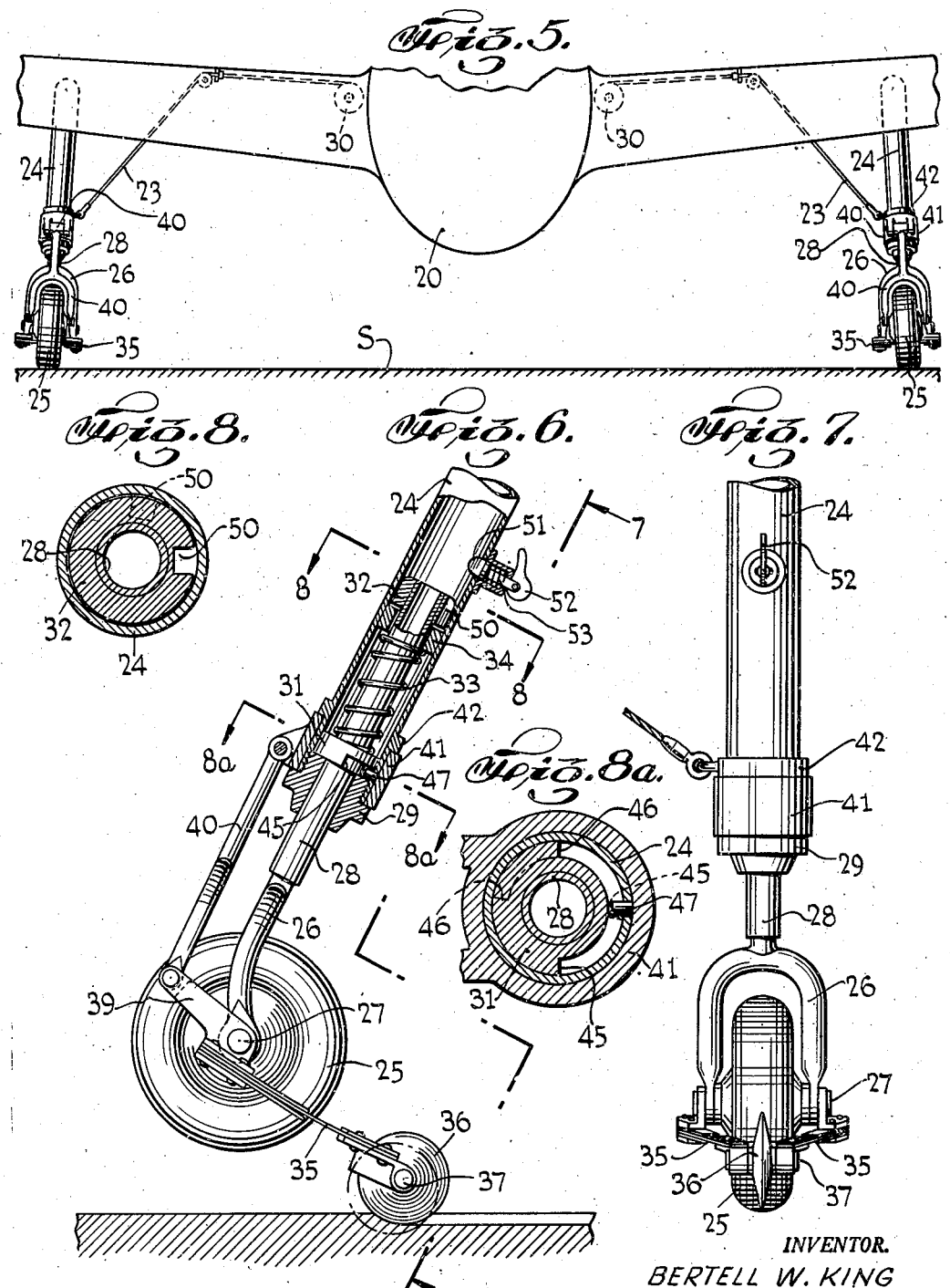

Aug. 2, 1949.  B. W. KING  2,477,881
CASTERING MEANS FOR AIRCRAFT LANDING MEANS
Filed March 23, 1945  4 Sheets-Sheet 3
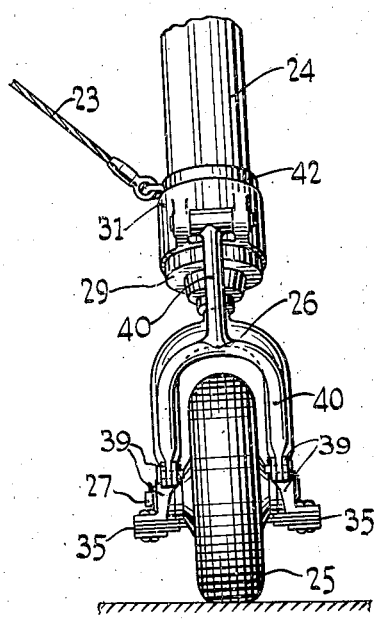
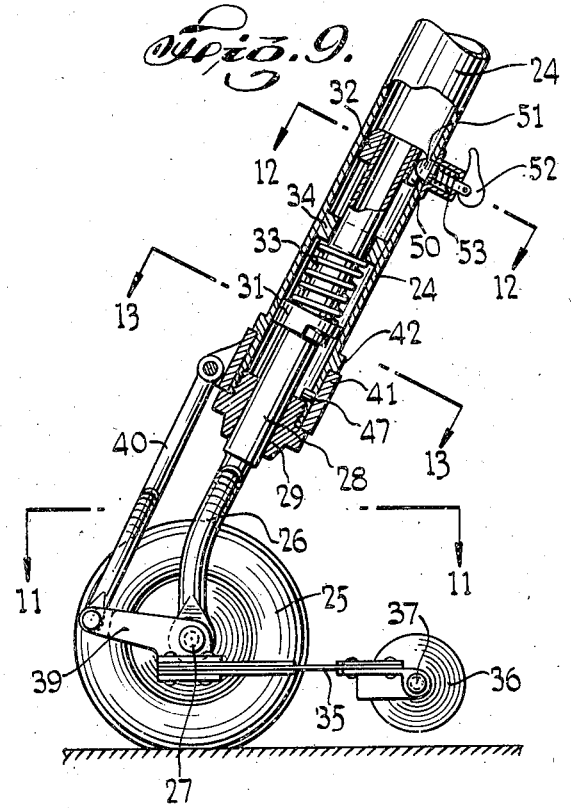
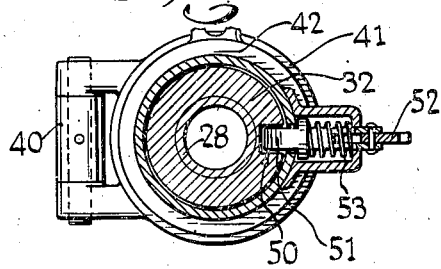
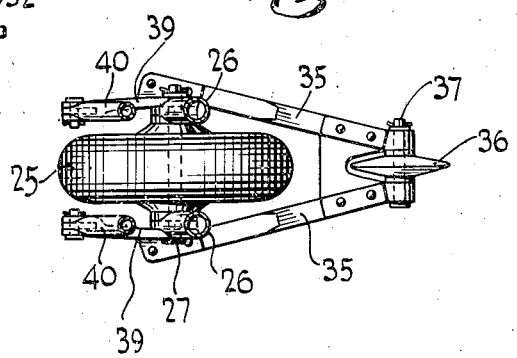
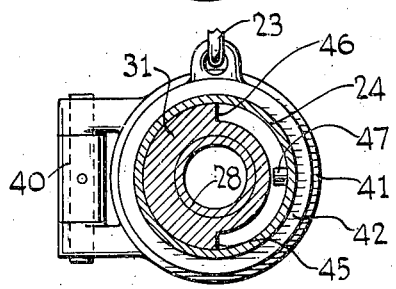
INVENTOR.
BERTELL W. KING
BY
Bohleber, Jasett & Montstream
ATTORNEYS Aug. 2, 1949.  B. W. KING  2,477,881
CASTERING MEANS FOR AIRCRAFT LANDING MEANS
Filed March 23, 1945  4 Sheets-Sheet 4
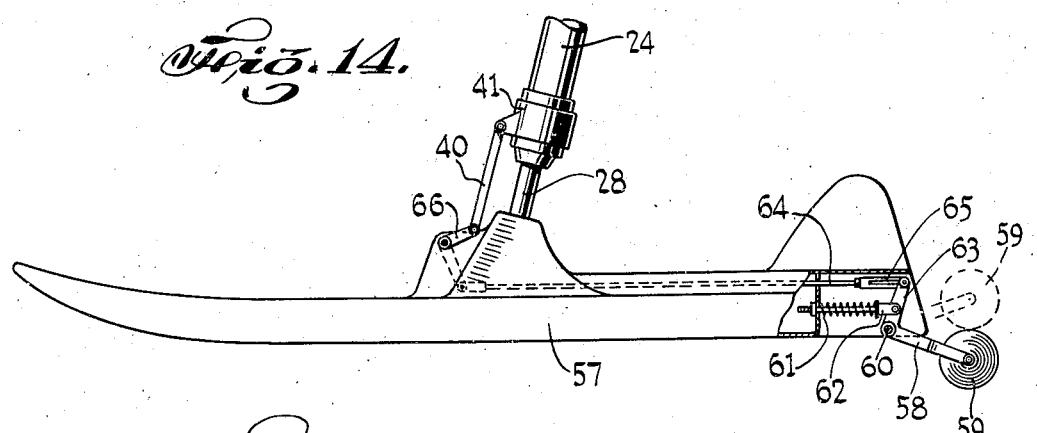
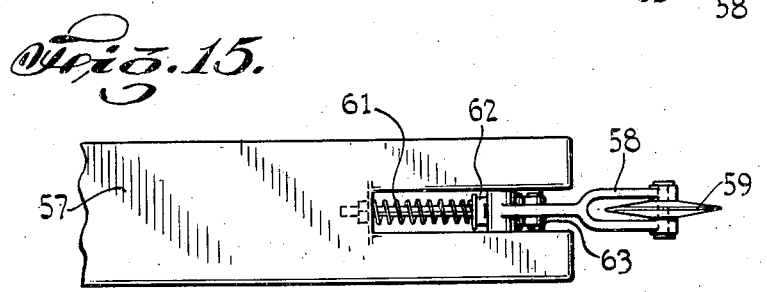
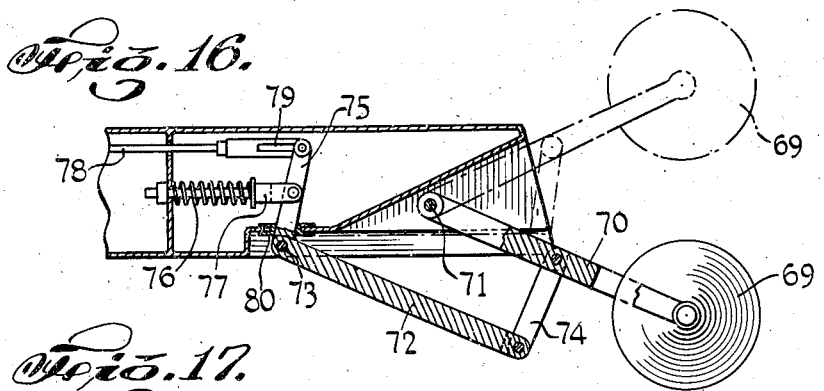
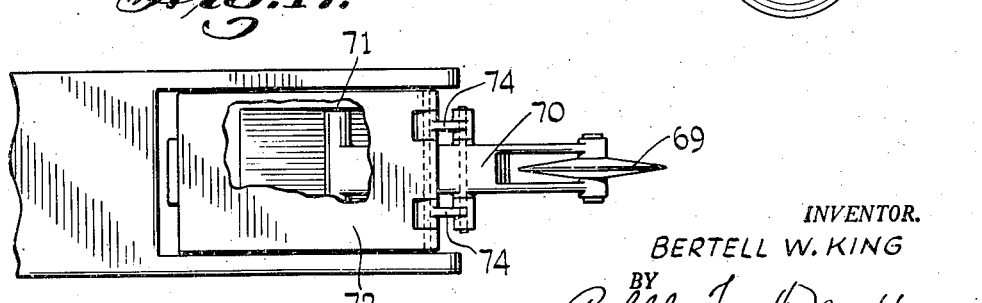
INVENTOR.
BERTELL W. KING
BY
Bohleber, Fassett & Mortstream
ATTORNEYS Patented Aug. 2, 1949

2,477,881

UNITED STATES PATENT OFFICE 2,477,881

CASTERING MEANS FOR AIRCRAFT LANDING MEANS

Bertell W. King, Brooklyn, N. Y.

Application March 23, 1945, Serial No. 584,397

13 Claims. (Cl. 244—102)

1

The invention relates to aircraft landing means which will caster in the direction of movement of a plane taking off or landing irrespective of the skew of the plane with respect to the direction of motion. Aircraft as heretofore constructed are required to take off and particularly land into the wind. The reason for this is that if the wind is not directly ahead, the plane will take off or land at an angle to the direction of flight or movement. The landing means therefore is at an angle to the direction of movement which throws an undue strain thereon and would usually blow out or tear off the tires from its respective wheel.

It is desirable if a plane can take off and land without heading into the wind. In order to do this safely however the landing means must be turned in the direction of movement or flight so that any skew position of the plane with respect to the direction of flight will not throw destructive strains upon the landing means.

It is an object of the invention to construct an aircraft castering landing means.

Another object of the invention is to construct an aircraft castering landing means which normally hangs below the landing means to caster the same, but is automatically raised when a portion and preferably a larger portion of the weight of the plane is carried by the landing means.

Another object of the invention is to construct an aircraft castering landing means which automatically locks in fixed position and which automatically releases when the weight of the plane on the landing means is decreased such as in flight.

A still further object is to construct aircraft castering landing means in which the extent of pivoting of the landing means is limited so long as there is no weight carried on the landing means and which automatically releases as soon as a portion of the weight of the aircraft is carried upon the landing means.

Another object is to construct a castering landing means of simple and effective design.

A still further object is to construct castering landing means which is suitable for planes with landing wheels or landing pontoons or skis.

Other objects of the invention will be more apparent from the following description taken in connection with the accompanying drawings which illustrate preferred embodiments of the invention as applied to wheeled landing means and pontoon landing means.

Figure 1 is a side elevation of an aircraft with

2 the landing wheels off of the ground and the castering means in contact with the ground in order to caster the wheels in the direction of movement.

Figure 2 is a partial side elevation of an aircraft showing the full weight of the plane carried by the landing means and the castering means raised off of the ground.

Figure 3 shows the skew position of an aircraft as it lands when not heading into the wind, and also shows the wheels castered into the direction of movement over the ground.

Figure 4 shows a partial view of an aircraft in the position in which it takes off or lands when heading directly into the wind.

Figure 5 is a front view of a portion of an aircraft showing the wheel type of landing means therefor.

Figure 6 is a plan view of the castering landing means with portions thereof in section.

Figure 7 is a rear view of the castering landing means.

Figure 8 is a cross sectional view taken on line 8—8 of Figure 6.

Figure 8a is a cross sectional view taken on line 8a—8a of Figure 6.

Figure 9 is a side elevation of the castering landing means, with parts in section, showing the full weight of the aircraft being carried by the wheel and the castering wheel raised out of position. The view also shows the locking means in locked position.

Figure 10 is a front view of the landing means.

Figure 11 is a view of the landing wheel and castering means as viewed from line 11—11 of Figure 9.

Figure 12 is a sectional view taken on line 12—12 of Figure 9.

Figure 13 is a sectional view taken on line 13—13 of Figure 9.

Figure 14 shows the castering landing means in the form of pontoons or skis for landing or taking off of water or snow.

Figure 15 is a partial view of the pontoon and of the castering means carried thereby.

Figure 16 is a view of a portion of a pontoon or ski with a different construction of castering means provided therefor.

Figure 17 is a bottom view of a portion of the pontoon or ski and the castering means of Figure 16.

The castering means to be described herein is applicable to any kind of aircraft, that illustrated in Figures 1 thru 4 being a single motored plane with two landing wheels. The plane or aircraft 20 is provided with landing means secured to any part of the plane, the landing means illustrated being pivoted to the wing 21 and swingable into recesses 22 in the wing contour when in flight.

The landing means includes a frame 24 which may be any suitable form, that illustrated being a tubular member which may be pivoted to the aircraft. A cable 23, which is attached to the frame, has its other end secured to a pulley 30 so that it limits the outward spreading action of the frames. The cable winds up on a spring turned spool when the landing means is folded into the wing. The frame 24 provides support for mounting means upon which the landing wheel 25 is carried. The wheel mounting means includes a fork 26 provided with an axle 27 upon which the wheel 25 is mounted. The fork may terminate in a tubular portion 28 which projects into the tubular frame 24 through an end cap or bearing 29 which is secured to the end thereof such as by threads. The mounting means for the landing wheel permits pivoting of the wheel upon the axis of the mounting means and also provides a resilient support for the mounting means and landing wheel vertically with respect to the frame 24. This mechanism includes a lower collar 31 and an upper collar 32 which are secured to the tubular portion 28 and slidable within the tubular frame 24. One of the collars such as 31 may limit the amount of extension of the mounting means and both collars may serve as a sliding bearing for the mounting means. A spring 33 abuts against the lower collar 31 and an abutment 34 carried by the tubular frame 24. The spring normally impels the landing wheel and mounting means to extended position when the aircraft is airborne. The mounting means and the landing wheel are free to pivot upon the axis of the tubular portion 28. The fork 26 may curve rearwardly to give the wheel some castering action when the castering means or pilot wheel is off of the ground and not operating.

Castering means is connected with the mounting means and landing wheel. Preferably castering means is provided for each wheel which extends directly to the rear of each landing wheel. In this construction an arm 35 in the form of a V is carried by the axle 27 and extends rearwardly of the wheel 25. When retracting means are provided for the castering means then the arm may be pivoted to the mounting means and particularly to the axle 27. The arm preferably carries a caster wheel 36 which may be rotatable on a pin 37 carried at the end of the arm. It is desirable that the arm 35 be flexible and for that reason a laminated spring type of arm 35 is used. The castering wheel may be of rubber with a sharp edge so that it may dig into the ground surface and aid thereby in castering the landing wheel in the direction of movement over the ground and retaining the same in that position, and also is suitable for landing on a concrete runway. The rubber wheel would be effective even after considerable wear.

Retracting means may be provided for the castering wheel which includes an extension 39 carried by the arm 35 which extends forwardly of the landing wheel. This extension is connected with a link 40 shown as a fork, straddling the wheel, the upper end of which is pivotally connected with a ring 41 which is rotatably retained on the frame 24 by an abutment 42 and the end cap 29.

When the plane comes in for a landing, the landing frames are extended downwardly to landing position as shown in Figure 1. The landing wheels or means are off of the ground which means that the mounting means is in extended position. In this position the castering wheel hangs below the landing wheel and consequently engages the ground before the landing wheels contact therewith. If the plane should be skewed with respect to the direction of movement over the ground as shown in Figure 3, the castering means engages the ground surface first and swings the landing wheels so that they point in the direction of movement over the ground, irrespective of the skewed position of the plane. The landing wheels therefore are in a position for free rolling movement when they contact the ground, that is, they are skewed with respect to the axis of the plane but are in alignment with the movement of the plane with respect to the ground, and consequently no strain is thrown upon the tires. As the weight of the plane is thrown upon the landing wheels the mounting means moves upwardly in the tubular frame 24 against the resistance of the spring 33. As the landing wheel 25 and its axle 27 move upwardly, the link 40 which is anchored to the ring 41 carried by the frame 24 pivots the extension 39 in a counterclockwise direction, which raises the castering wheel 36. When the full weight of the plane is upon the landing wheels the castering means may be raised completely off of the ground as shown in Figure 9.

Means may be provided to limit the pivotal movement of the landing means and the mounting means therefor. This means includes shoulders or abutments 45 and 46 formed by the ends of a channel extending around the periphery of the collar 31. A pin 47 carried by the frame 24 is received in the channel so that the abutments may engage and limit the pivotal movement of the mounting means. It is clear that the pin may be carried either by the frame or the mounting means and the abutments may be carried by the other of these means. It will be observed that the means for limiting the pivotal action of the mounting means are in cooperative engagement only when the mounting means and landing wheel are in extended position with respect to the frame 24. As soon as some of the weight of the plane is carried upon the landing wheels the collar 31 moves upwardly which automatically releases engagement of the pin 47 within the channel and hence with the abutments as shown in Fig. 9.

Means may be provided to lock the mounting means and hence the landing means in a position parallel with the axis of the plane. This means preferably is automatically releasable when the plane becomes partially airborne and is automatically engageable when the plane has slowed down so that practically its full weight is on the ground. The locking means particularly illustrated includes a slot or groove 50, which extends through the entire length of the collar 32. A locking bolt 51 is normally projected into the slot 50. The bolt 50 is located upon the frame 24 in accordance with the position which the mounting means and collar 32 assumes when the full weight of the plane is carried upon the landing means. Because the slot extends vertically through the collar 32, as soon as some of the weight of the plane is taken off of the landing wheels as the plane begins to become airborne, the collar 32 moves downwardly in the tubular frame 24 which automatically disengages the locking bolt 51 from the slot 50 as shown in Figure 6. When the plane lands and its speed is reduced sufficiently so that the landing wheels are carrying most or all of the weight of the plane the collar engages the bolt and cams it inwardly so that the bolt rides on the outer surface of the collar. When the wheels come into alignment with the axis of the plane, the bolt moves into the slot 50 and thereby automatically locks the wheels in position in alignment with the axis of the plane.

It is desirable many times to caster the wheels when moving the plane on the ground or in a hangar. In order to permit this the bolt 51 may be withdrawn from the slot 50 and the landing wheels are then free to pivot on the frame at will. The bolt, therefore, may be retracted or disengaged from the slot by means of the cam lever 52, which pulls the bolt into a recess in the frame against the tension of a spring 53. If full castering of the wheels should be desired when taking off for flight, the bolt may be retracted by the cam lever.

The castering means for aircraft landing means is applicable to flat landing means such as skis for landing aircraft upon snow which skis may also serve as pontoons for landing aircraft upon the surface of water. Two forms of construction are illustrated in Figures 14 through 17, some of which parts are the same as those used for the landing wheel construction, and hence these parts need not be again described. The landing means in the form of skis or pontoons 57 are carried by a frame 24 which may be pivoted to some part of the aircraft and may be moved into recesses in the plane structure if desired in known manner. The mounting means for the pontoon 57 is like that illustrated in Figure 6 and need not be further described.

The castering means includes an arm 58 upon which the castering wheel 59 may be mounted. The arm is carried upon a pivot 60 carried by the rear end of the ski or pontoon and the castering wheel is normally retained in a position below the ski by a spring 61 which impels the push rod 62 to the right as shown in Figure 14 which in turn rotates the extension 63 of the arm 58 and the arm in a clockwise direction. The extension 63 is connected by a link 64 in which there is an elongated slot 65. The slot receives a pin carried by the extension 63 to provide a lost motion connection therebetween. The other end of the link 64 is connected to a pivoted bell crank 66 carried by the ski or pontoon which is connected with the link 40. The connection through the link 40, bell crank 66, link 64 and extension 63 operates to raise the castering means or wheel 59 as the weight of the aircraft is placed upon the landing means 57. This raising mechanism operates in the same manner as described in connection with the landing wheel construction which need not be again described.

It will be noted that the lost motion connection permits the castering wheel to pivot upwardly out of the way in the event that it should strike an obstruction irrespective of whether or not some of the weight of the aircraft is being carried upon the skis or pontoons.

Figures 16 and 17 show another form of connection for the castering means. Here the castering wheel 69 is carried upon an arm 70 which is mounted upon a pivot pin 71 carried at the rear of the ski or pontoon. A flap 72 is pivoted on pin 73 to the lower surface of the pontoon and normally hangs downwardly at an angle therefrom. The flap 72 is connected by a link 74 with the castering wheel arm 70. The flap 72 carries an extension 75 which is normally propelled in a clockwise direction by a spring 76 which pushes a push rod 77 to the right as viewed in Figure 16. The push rod is connected with the extension 75. A connecting link 78 corresponds with the connecting link 64 of Figure 14 which link has an elongated slot 79 which provides a lost motion connection between the extension 75 and the link 78. This lost motion connection permits the flap and the castering means to pivot upwardly out of the way if an obstruction is engaged and return to down position upon passing over the obstruction. It also pivots the castering wheel upwardly when it hits the snow or water. The extension 75 projects through a resilient gasket 80 which permits the connecting parts to be carried within the pontoon and prevents leakage of water into the pontoon.

The flap 72 is relatively wide so that when it hits the surface of the water or snow it propels the castering means to its upward position. When the weight of the aircraft is carried upon the skis or pontoons the connecting link 78 operates in the manner described in connection with the landing wheel construction to raise the flap 72 of the castering means to its up position.

The castering means has been described as being applied to the landing wheels of the plane which carry most of the weight thereof, however, the castering means is applicable also to the tail wheel of the plane.

The invention is presented to fill a need for improvements in a castering means for aircraft landing means. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. An aircraft castering landing means comprising a frame means, landing means carried by the frame means upon which the plane takes off and lands, means mounting the landing means for pivotal movement upon the frame means and for resilient vertical movement, castering means connected with the landing means and extending rearwardly therefrom, the castering means normally extending below the landing means to contact the surface prior to contact of the landing means therewith to turn and retain the same in the direction of movement, and means operating upon vertical movement of the landing means to raise and lower the castering means a greater distance than the movement of the landing means whereby the castering means is out of contact with the ground when the plane is standing.

2. An aircraft castering landing means comprising a frame means, landing means carried by the frame means upon which the plane takes off and lands, means mounting the landing means for pivotal movement upon the frame means and for resilient vertical movement, castering means for the landing means, means resiliently supporting the castering means and connected with the landing means so that it extends rearwardly therefrom, the castering means normally extending below the landing means to contact the surface prior to contact of the landing means therewith to turn and retain the same in the direction of movement, and means operating upon vertical movement of the landing means to raise and lower the castering means a greater distance than the movement of the landing means whereby the castering means is out of contact with the ground when the plane is standing.

3. An aircraft castering landing means comprising a frame means, landing means carried by the frame means upon which the plane takes off and lands, means mounting the landing means for pivotal movement upon the frame means and for resilient vertical movement, castering means connected with the landing means and extending rearwardly therefrom, the castering means normally extending below the landing means to contact the surface prior to contact of the landing means therewith to turn and retain the same in the direction of movement, means operating upon vertical movement of the landing means to raise and lower the castering means, and means engaging in extended position of the landing means for limiting the pivotal movement thereof.

4. An aircraft castering landing means comprising a frame means, landing means carried by the frame means upon which the plane takes off and lands, means mounting the landing means for pivotal movement upon the frame means and for resilient vertical movement, castering means connected with the landing means and extending rearwardly therefrom, the castering means normally extending below the landing means to contact the surface prior to contact of the landing means therewith to turn and retain the same in the direction of movement, means operating upon vertical movement of the landing means to raise the castering means, and means engaging in extended position of the landing means for limiting the pivotal movement of the mounting means with respect to the frame means including abutments carried by one of said means and a stop carried by the other means, the abutments and stop being in cooperating position in extended position of the mounting means.

5. An aircraft castering landing means comprising a frame means, landing means carried by the frame means upon which the plane takes off and lands, means mounting the landing means for pivotal movement upon the frame means and for resilient vertical movement, castering means connected with the landing means including an arm extending rearwardly therefrom and pivoted to the mounting means, the castering means normally extending below the landing means to contact the surface prior to contact of the landing means therewith to turn and retain the same in the direction of movement, and link means connecting the pivoted arm to the frame means and operating upon vertical movement of the landing means to raise the portion of the castering means which extends below the landing means.

6. An aircraft castering landing means comprising a frame means, landing means carried by the frame means upon which the plane takes off and lands, means mounting the landing means for pivotal movement upon the frame means and for resilient vertical movement, castering means connected with the landing means including an arm having vertical flexibility extending rearwardly therefrom and pivoted to the mounting means, the castering means normally extending below the landing means to contact the surface prior to contact of the landing means therewith to turn and retain the same in the direction of movement, and link means connecting the pivoted arm to the frame means and operating upon vertical movement of the landing means to raise the portion of the castering means extending below the landing means.

7. An aircraft castering landing means comprising a frame means, landing means carried by the frame means upon which the plane takes off and lands, means mounting the landing means for pivotal movement upon the frame means, castering means connected with the landing means and extending rearwardly therefrom, the castering means normally extending below the landing means to contact the surface prior to contact of the landing means therewith to turn and retain the same in the direction of movement, and means for locking the mounting means against pivotal movement and automatically releasable upon extension of the mounting means for the landing wheels.

8. An aircraft castering landing means comprising a frame means, landing means carried by the frame means upon which the plane takes off and lands, means mounting the landing means for pivotal movement upon the frame means and for resilient vertical movement, castering means connected with the landing means and extending rearwardly therefrom, the castering means normally extending below the landing means to contact the surface prior to contact of the landing means therewith to turn and retain the same in the direction of movement, and means engageable when the mounting means is in retracted position for locking the mounting means against pivotal movement including means movable with the mounting means and fixed means engageable with the movable means when in retracted position only.

9. An aircraft castering landing means comprising a frame means, landing means carried by the frame means upon which the plane takes off and lands, means mounting the landing means for pivotal movement upon the frame means and for resilient vertical movement, castering means connected with the landing means and extending rearwardly therefrom, the castering means normally extending below the landing means to contact the surface prior to contact of the landing means therewith to turn and retain the same in the direction of movement, and manually operated means for locking the mounting means against pivotal movement when in retracted position and automatically releasable upon extension of the mounting means for the landing wheel.

10. An aircraft castering landing means comprising a frame means, landing means carried by the frame means upon which the plane takes off and lands, means mounting the landing means for pivotal movement upon the frame means and for resilient vertical movement including a slidable rod, castering means connected with the landing means and extending rearwardly therefrom, the castering means normally extending below the landing means to contact the surface prior to contact of the landing means therewith to turn and retain the same in the direction of movement, and manually operated means for locking the mounting means against pivotal movement when in retracted position and automatically releasable upon extension of the mounting means including a collar carried by the slidable rod, a groove extending from end to end of the collar, and a manually operable bolt carried by the frame and located at the retracted position of the collar, the bolt being movable into engagement with the groove.

11. An aircraft castering landing means comprising a frame means, flat landing means carried by the frame means upon which the plane takes off and lands, means mounting the landing means for pivotal movement upon the frame means and for resilient vertical movement, castering means connected with the landing means and extending rearwardly therefrom, the castering means normally extending below the landing means to contact the surface prior to contact of the landing means therewith to turn and retain the same in the direction of flight, and means connecting the castering means with the frame means whereby the castering means is moved upwardly upon upward movement of the mounting means with respect to the frame means including a lost motion connection which enables the landing means to move upwardly independently of the movement of the mounting means.

12. An aircraft castering landing means comprising a frame means, flat landing means carried by the frame upon which the plane takes off and lands, means mounting the landing means for pivotal movement upon the frame means, castering means connected with the landing means and extending rearwardly therefrom, the castering means normally extending below the landing means to contact the surface prior to contact of the landing means therewith to turn and retain the same in the direction of flight, flap means pivotally carried by the landing means and extending downwardly and rearwardly thereof, and means connecting the flap means with the castering means to move the same upwardly when the flap means engages the surface.

13. An aircraft castering landing means comprising a frame means, landing means carried by the frame means upon which the plane takes off and lands, means mounting the landing means for pivotal movement upon the frame means and for resilient vertical movement, castering means connected with the landing means and extending rearwardly therefrom, the castering means normally extending below the landing means to contact the surface prior to contact of the landing means therewith to turn and retain the same in the direction of movement, and means for locking the mounting means against pivotal movement when in retracted position and automatically releasable during take-off and automatically engageable upon landing.

BERTELL W. KING.

REFERENCES CITED

The following references are of record in the file of this patent:

UNITED STATES PATENTS

| Number | Name | Date |
| --- | --- | --- |
| 1,352,077 | Martin | Sept. 7, 1920 |
| 2,349,067 | Wright | May 16, 1944 |

FOREIGN PATENTS

| Number | Country | Date |
| --- | --- | --- |
| 384,253 | France | Jan. 30, 1908 |
| 461,055 | France | Oct. 20, 1913 |